United States Patent [19]
Miller, Jr.

[11] 3,965,869
[45] June 29, 1976

[54] ASYMMETRICAL DIVIDER BLOCK FOR A ROTARY DISPLACEMENT ENGINE

[76] Inventor: Lloyd Edward Miller, Jr., 389 Granello Ave., Coral Gables, Fla. 33146

[22] Filed: Mar. 24, 1975

[21] Appl. No.: 561,069

[52] U.S. Cl. .............................. 123/8.45; 418/169; 418/191
[51] Int. Cl.² ..................... F02B 53/00; F01C 1/08; F04C 17/04
[58] Field of Search .......... 123/8.45; 418/191, 225, 418/227, 169, 170, 171

[56] References Cited
UNITED STATES PATENTS

| | | | |
|---|---|---|---|
| 763,868 | 6/1904 | Exline | 418/227 X |
| 1,467,944 | 9/1923 | Mason | 418/227 |
| 1,580,808 | 4/1926 | Borden | 418/227 |
| 2,920,576 | 1/1960 | Pedersen | 418/227 |

FOREIGN PATENTS OR APPLICATIONS 988,951    5/1951    France .............................. 418/227

Primary Examiner—Carlton R. Croyle
Assistant Examiner—Michael Koczo, Jr.

[57] ABSTRACT

Relating to use in 4-stroke displacement engines which were disclosed in a prior patent, this improvement prevents free communication of fluid and reduces internal leakage through the ported pass or between the two displacement sections of these machines.

3 Claims, 3 Drawing Figures

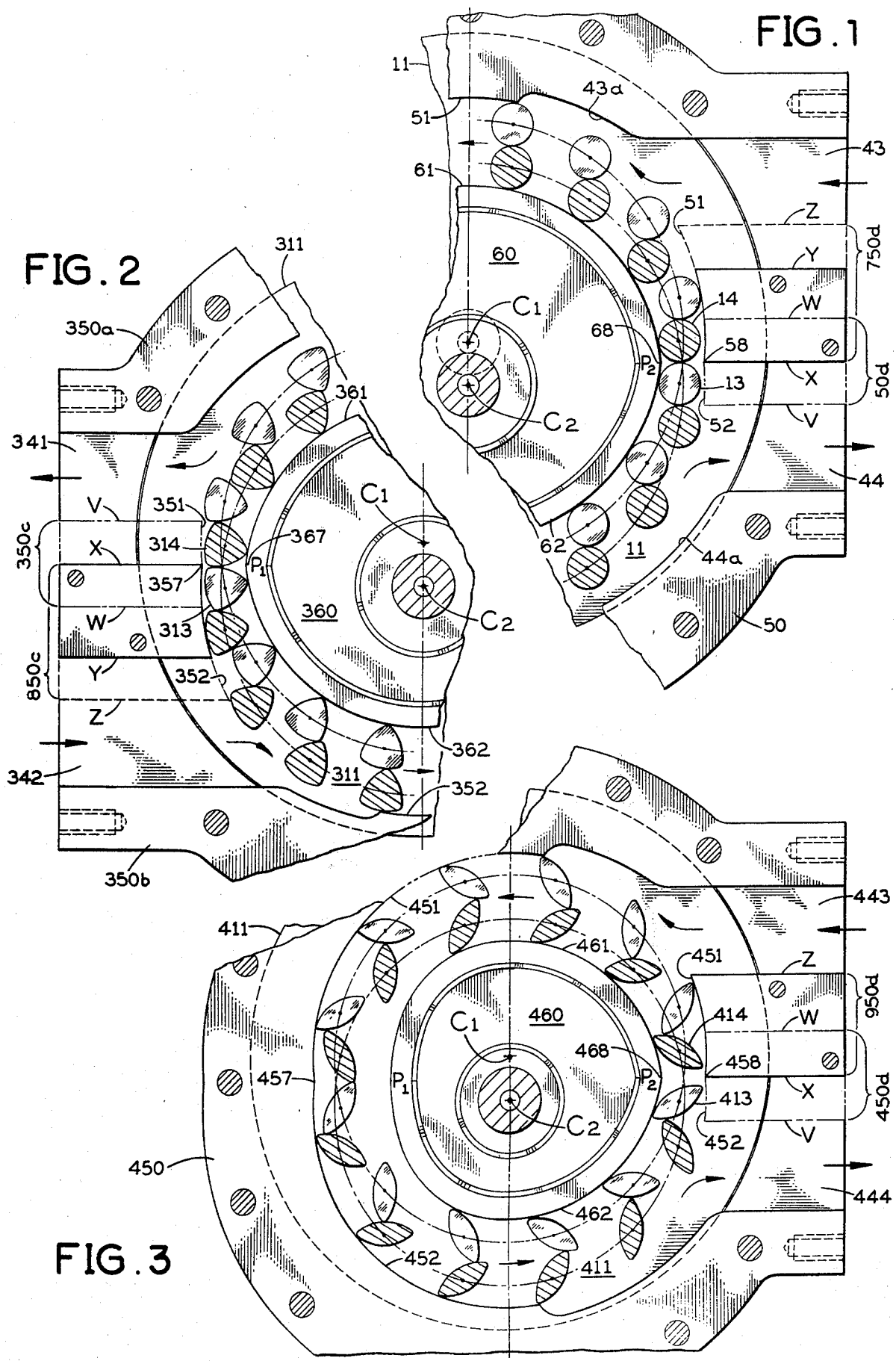

ASYMMETRICAL DIVIDER BLOCK FOR A ROTARY DISPLACEMENT ENGINE

BACKGROUND OF THE INVENTION

1. Field of the Invention

This invention pertains to an improved divider block for use in displacement engines and pumps of the type disclosed in my U.S. Pat. No. 3,877,442, filed Oct. 5, 1973.

Such machines in principle employ a pair of parallel gear wheels having circularly disposed teeth on their faces which intermesh to define sealed working chambers within a generally annular cavity. These chambers each compress and expand twice per one revolution of the wheels, enabling adaptation as a 4-stroke combustion engine or for pump, compressor or fluid motor applications. While inherently providing a dual volumetric displacement, the principle may be modified, as originally disclosed, to provide only a single displacement, if desired.

2. Description of Prior Art

According to the cycle employed, the housing in these machines can be configured with either single or twin intake and exhaust ports, requiring respectively, either one or two divider blocks, each of which separates, as does a partition wall, the intake port of one displacement section from the exhaust port of the opposite displacement section. The divider blocks comprise a part of the housing entirety, although not contiguous thereto, but are dowelled to adjoining spacer plates which surround the gear wheels. The inner or interior surfaces of the blocks and housing are semi-cylindrical for sealing engagement by the curved surfaces of the teeth of the gear wheels. The lateral or face surfaces of the blocks and housing are sealingly contacted by the respective faces of the disc portions of the gear wheels to define sealed working chambers between the gear teeth.

In conjunction with a core member which is fixed or non-rotatively supported within the cage defined by the intermeshing teeth of the two gear wheels, each divider block defines a narrow pass through which the teeth of the gear wheels merge in single-file passage during rotation.

The divider blocks should be made as thin as possible, which is to say that the adjacent intake and exhaust ports should be closely spaced so as not to expend undue angular rotational movement of the gear wheels for porting. The minimum thickness a divider block may be reduced to, however, considering static rather than dynamic compression or expansion, is that point where no free communication or leakage occurs around the teeth and through the ported pass.

As will become hereinafter more lucid, there exists obscurely in the machines of the prior patent some slight free communication at the ported passes in certain rotative positions of the gear teeth. This can be disadvantageous or inconsequential, depending upon the intended type of service. The improvement as herein disclosed prevents or reduces leakage through the ported passes or between the two displacement sections in any rotative position of the gear teeth.

SUMMARY OF THE INVENTION

The improvement thus provides an asymmetrical divider block having an interior surface which is sealingly contacted by at least one of the teeth of the gear wheels at all times to restrict the leakage of fluid and prevent free communication through the ported pass of these machines.

An extended divider block is also provided which prevents free communication through the ported pass by allowing at least one set of mating teeth of the gear wheels to simultaneously contact both the semi-cylindrical interior surface of the block and the exterior curved surface of the core member at all times.

The principal object of the improved divider block is the restriction of pressure loss which would otherwise occur between high and low pressure regions within the machine.

A second object of the asymmetrical divider block is the prevention of further compression from occurring within the ported pass.

A third object is the reduction in contamination or mixing of dissimilar fluids in the two displacement sections of the machine.

Other objects, advantages and features of the improvement will be apparent from the following detailed description when read in conjunction with the accompanying drawings.

BRIEF DESCRIPTION OF THE DRAWINGS

FIG. 1 is a fragmentary view of the ported pass area of the FIG. 1 embodiment of U.S. Pat. No. 3,877,442, but here incorporating the new divider block as constructed in accordance with principles of the present disclosure.

FIG. 2 is a fragmentary view of the left-hand or $P_1$ ported pass of the FIG. 3 embodiment of said prior patent similarly showing the improved divider block.

FIG. 3 is the embodiment of FIG. 4 of the prior patent but now including the improved block.

DESCRIPTION OF THE PREFERRED EMBODIMENT

With reference to FIG. 1, an exposed portion of the 4-stroke displacement engine is illustrated revealing the cylindrical pin teeth 13, 14 of the gear wheels 11, 12 in transit through the ported pass $P_2$. The disc portion of the nearest or lower gear wheel 12 is omitted here, as in FIG. 1 of the prior patent, to expose the engine interior. As may be seen, a new divider block 750d is shown whose purpose is to prevent higher pressure exhaust gases from being blown through the pass $P_2$ (in a counterclockwise direction), which would tend to dilute or preignite fresh charge just entering the engine via the intake port 43. This was the problem with the former block 50d of the prior patent. For comparison, the 50d block has been superimposed in FIG. 1, the perimeter thereof being shown in phantom.

It may be recalled that each pass $P_1$ and $P_2$, as in the original FIG. 1, is defined by the aligned apices 57, 67, 58, 68 of the housing 50, of which the divider block comprises a non-integral part, and the fixed core member 60. These apices are the points of intersection of the curved walls or surfaces 51, 52 and 62, 61, radiused, respectively, from the wheel axes $C_1$, $C_2$.

In the present FIG. 1, the intake port 43 and exhaust port 44 have been repositioned from those shown earlier, so that the new divider block 750d is now asymmetrical with respect to $P_2$, having only a single interior semi-cylindrical curved surface or arc 51. This is in contrast to the former block 50d which was symmetrically centered at $P_2$, having interior surfaces 51, 52 of equal circular length. The port sides of the 50d block are denoted in present FIG. 1 by the phantom lines $v$ and $w$. The asymmetrical block 750$d$, however, has its exhaust side, denoted by the letter $x$, coincident with the apex 58 and in alignment with $P_2$ or the apex 68 of the core 60. The intake side of the new block is denoted by either the solid line $y$ or the dotted line $z$. As will become hereinafter more obvious, the shorter configuration $xy$, while allowing some negligible or restricted leakage, provides higher volumetric intake efficiency versus the extended block $xz$ which completely prevents free communication through the pass.

Free communication occurs between the former divider block 50$d$ and the pin teeth 13, 14 when the gear wheels are rotated through an arc equal to one tooth diameter from their position in the original FIG. 1 to that illustrated in the present FIG. 1. The gap or absence of sealing contact in the latter position is a consequence of the (cross-hatched) teeth 14 of the lower wheel 12 contacting only the lower arc or semi-cylindrical surface 52 of the divider block while the teeth 13 of the upper wheel 11 contact only the upper arc 51 of the block. It is to be noted that no gap exists between the teeth and block when a mating or matched set of pins is centered at $P_2$ as in the prior FIG. 1, mating teeth comprising a tooth from each wheel which revolve relatively about one another in sealing contact during rotation of the wheels. Leakage does result past the former block 50$d$, however, when an unmatched pair is centered at $P_2$, as in the present FIG. 1. Each of these positions occurs as many times per revolution, obviously, as there are teeth per wheel. It is also important to note that if it were not for the housing wall being interrupted for the ports, the next tooth on either side of the unmatched pair centered at $P_2$ would check this leakage path in the manner occurring on the core side of the pins or at the unported pass $P_1$ in the original FIG. 1.

As may now be easily seen, this leakage situation can be corrected according to the present disclosure by increasing the circular length of one or both of the arcs 51, 52 of the divider block so as to provide sealing contact with at least one tooth of either wheel at all times. Phrased differently, this is equivalent to moving the adjacent intake port 43 and exhaust port 44 farther apart. As shown in the present FIG. 1, the upper arc 51, preferably, has been lengthened in the direction of the intake port, defining the block $xy$ which now provides simultaneous contact with two adjacent teeth of the upper wheel 11, or provides continuous contact with at least one tooth of the upper wheel at all times to restrict leakage through the pass. The lower arc 52 has been eliminated so as to prevent unwanted and useless trapped compression from continuing in the pass as the teeth enter from the exhaust side, the spaces around the teeth diminishing in volume upon entry. The disadvantage in lengthening the arc 51 of the block appreciably toward the intake side, however, is that a trapped or confined suction is formed between the teeth leaving the pass, resulting in a slight loss of volumetric efficiency, but this is less undesirable than the alternative of lengthening the block on the exhaust side. It is to be understood, therefore, that the $xy$ block is a practical embodiment which adequately restricts or reduces the leakage of spent combustion gases through the pass, but does not completely prevent free communication therethrough. The reason for this is that some very slight leakage occurs between two matched sets of teeth or between unmatched teeth or pins on both sides of the pass. This leakage route may be seen in the original FIG. 1 where the spaces between matched sets of teeth widen upon leaving the pass.

If no free communication through the pass can be tolerated, the arc 51 of the divider block may be extended to the dotted line $z$ in the present FIG. 1, which provides that at least one matched set of teeth is in contact with the semi-cylindrical interior surface 51 of the block and with the exterior curved surface 61 of the core 60 at all times. This is to say that a matched set comprises a tooth 14 from the lower wheel 12 which is in sealing contact with the core surface 61 as well as with its mating tooth 13 of the upper wheel 11, the latter tooth also being in sealing contact with the interior surface 51 of the divider block. The matched set thus constitutes a sealed moving abutment in relationship to the housing and core surfaces. Unfortunately, the extended or $xz$ block consumes more of the intake phase of the rotative cycle and as a result a slightly lower volumetric efficiency is provided than if the short $xy$ block were used. For other modes of operation, including 4-port housings, where higher pressure differentials are encountered between intake and exhaust ports, such as when the intake is highly supercharged, the extended $xz$ block may be required to prevent free communication through the pass.

Referring now to FIG. 2, the left-hand port area of the 4-port dual displacement machine of FIG. 3 of the prior patent is illustrated. It is to be noted that the side shown is typical of the right-hand side which has been omitted for simplicity. The divider block 850$c$, disposed between the intake port 342 of the lower displacement section and the exhaust port 341 of the upper displacement section, has been constructed similarly to that of the present FIG. 1 embodiment. In this machine, using the triangular toothform, it is to be noted that all aspects of restricting leakage or preventing free communication through the ported pass as described relevant to the present FIG. 1 embodiment apply equally here. As may be seen, an unmatched set of triangular teeth is shown centered at the pass $P_1$, demonstrating the leakage which occurs between the teeth 313, 314 and the original block 350$c$, the latter being again shown in phantom. Accordingly, the leakage may be reduced by using the short $xy$ block or all free communication may be prevented by utilizing the extended $xz$ block.

With reference to FIG. 3, the asymmetrical block 950$d$ is shown adapted to the embodiment of FIG. 4 of the prior patent in which the quasi-elliptical canted vane toothform was employed in a 2-port single displacement housing. Unmatched teeth 413, 414 are again shown at the ported pass $P_2$, illustrating the gap which occurs between the apices of these two teeth and the original divider block 450$d$. Although the wheels shown each have only 12 vanes, in contrast to 16 teeth as in the foregoing embodiments, the block $xz$ of the present embodiment is considerably shortened while still allowing no free communication through the pass. This is due to a canted tooth 413 of the upper wheel 411 making contact with the opposite core surface 462 and block surface 451 at the same time. As a consequence, and unlike the preceding embodiments, only a single tooth is required to at all times contact the interior surface of the block, the requirement that a mating set of teeth simultaneously contacts the block and core being not applicable to the canted toothform.

The improved divider block as herein disclosed may be also employed with the embodiments of FIGS. 5 and 6 of the prior patent, these having a wider spacing between the gear wheel axes and a difference of speed between the gear wheels. It may be noted that the mating teeth thereof do not remain in continuous contact with each other as do the mating teeth of the preceding embodiments. It is to be understood, therefore, that where at least one set of mating teeth is required to at all times contact the divider block and core surfaces to prevent free communication through the pass, mating teeth in the present embodiments must be construed to mean those teeth which are instantly mating in the vicinity of the divider blocks.

The subject matter hereof is adaptable to devices employing tooth constructions other than those shown, but which may be configured according to principles disclosed in my said prior patent.

Having thus described my improvement, I claim:

1. A positive displacement device employing a pair of parallel gear wheels which are rotatable on separated axes, gear teeth circularly disposed on the face of each of said wheels which teeth intermesh with said teeth on the opposite of said wheels, a housing and core member sealingly disposed between said wheels which define a generally annular track in which said teeth revolve, said teeth dividing said track into sealed working chambers whose volumes each contract and expand twice during one revolution of said chambers in said track, port means for providing the ingress and egress of fluid, respectively, to and from said chambers, said housing including at least one divider block which in conjunction with said core member defines a ported pass through which said teeth travel during rotation of said gear wheels, said block having an interior surface which is sealingly contacted by at least one of said teeth at all times to restrict the leakage of fluid and prevent free communication through said pass.

2. A divider block as defined in claim 1 whose said interior surface is semi-cylindrical, being sealingly contacted by at least one of said teeth of said wheels at all times.

3. A divider block as defined in claim 1 whose said interior surface is extended to provide additional tooth contact, said teeth effecting seal contact with said teeth of said opposite wheel to comprise mating sets of teeth, at least one of said sets in rotative sequence providing seal contact at all times with said interior surface of said divider block and with said core member to prevent free communication of fluid through said ported pass.

* * * * *